United States Patent
Somers

(10) Patent No.: US 6,243,396 B1
(45) Date of Patent: Jun. 5, 2001

(54) COMMUNICATIONS NETWORK MANAGEMENT SYSTEM

(75) Inventor: Fergal Thomas Somers, Wicklow (IE)

(73) Assignee: Broadcom Eireann Research Limited, Dublin (IE)

( * ) Notice: Subject to any disclaimer, the term of this patent is extended or adjusted under 35 U.S.C. 154(b) by 0 days.

(21) Appl. No.: 09/011,662
(22) PCT Filed: Jul. 31, 1996
(86) PCT No.: PCT/IE96/00051
  § 371 Date: Apr. 15, 1998
  § 102(e) Date: Apr. 15, 1998
(87) PCT Pub. No.: WO97/07638
  PCT Pub. Date: Feb. 27, 1997

(30) Foreign Application Priority Data

Aug. 15, 1995 (IE) .................................................. S950617

(51) Int. Cl.$^7$ ........................................................ H04J 3/16
(52) U.S. Cl. .......................... 370/469; 370/465; 709/202; 709/201
(58) Field of Search .................................. 370/428, 235, 370/252, 230, 469; 379/112, 114; 709/202, 201, 223, 250

(56) References Cited

U.S. PATENT DOCUMENTS

| | | | |
|---|---|---|---|
| 5,696,697 | * 12/1997 | Blau | 379/112 |
| 5,974,237 | * 10/1999 | Shurner | 709/224 |
| 6,049,819 | * 4/2000 | Buckle | 709/202 |
| 6,052,722 | * 4/2000 | Taghadoss | 709/223 |

* cited by examiner

Primary Examiner—Douglas Olms
Assistant Examiner—Ricardo M. Pizarro
(74) Attorney, Agent, or Firm—Jacobson, Price, Holman & Stern PLLC

(57) ABSTRACT

A management system has a hierarchical structure of interconnected management authorities controlling communication network resources. The system also includes user interfaces. Each authority has a number of agents which communicate internally with other agents and externally with other agents in a uniform manner using KQML semantics. Agents may be intelligent or simply reactive. Generally, reactive agents are located within a platform part of an authority and intelligent agents are located within the controlling part of an authority. Agents within the controlling part are grouped into functional components to provide FCAPS functionality.

28 Claims, 7 Drawing Sheets

FIG. 9

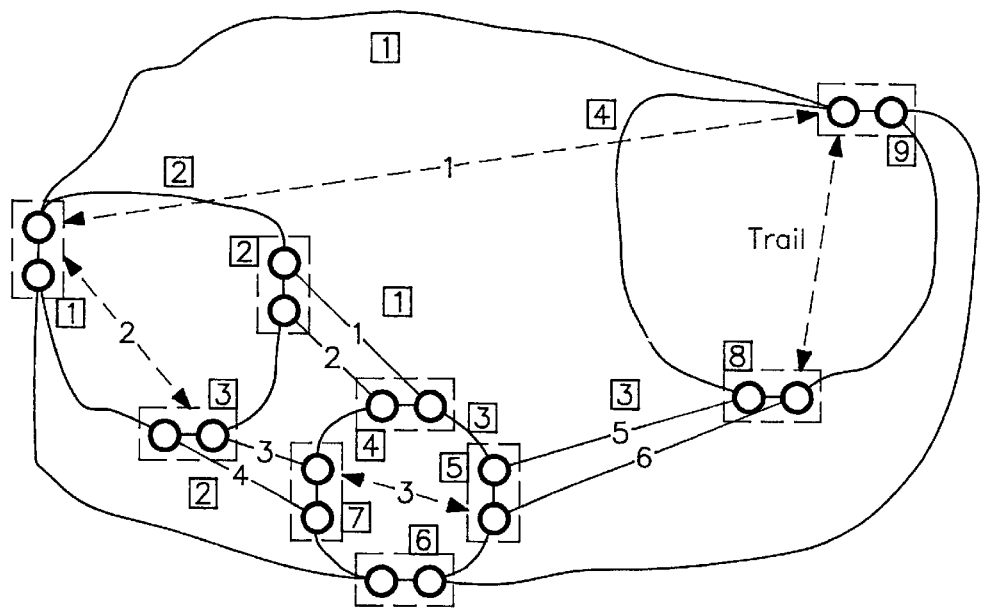

FIG. 10(a)

fabric

| reserved | | | |
|---|---|---|---|
| fabricid | 2 | 3 | 4 |
| containing Domain | 1 | 1 | 1 |
| contained TP Pools | 1<br>2<br>3 | 4<br>5<br>6<br>7 | 8<br>9 |
| supported Trails | 1 | 1 | 1 | domain (inherits from Fabric)

| reserved | — |
|---|---|
| fabricid | 1 |
| containing Domain | — |
| contained TP Pools | 1<br>6<br>9 |
| supported Trails | |
| contained Fabrics | 2<br>3<br>4 |
| contained Link Pools | 1<br>2<br>3 |

TPP

| reserved | | | | | | | | | |
|---|---|---|---|---|---|---|---|---|---|
| TPPid | 1 | 2 | 3 | 4 | 5 | 6 | 7 | 8 | 9 |
| containing Fabrics | 1<br>2 | 2 | 2 | 3 | 3 | 1<br>3 | 3 | 4 | 1<br>4 |
| contained TPs | 1<br>2 | 3<br>4 | 5<br>6 | 7<br>8 | 9<br>10 | 11<br>12 | 13<br>14 | 15<br>16 | 17<br>18 |
| connecting Link Pool | — | 1 | 2 | 1 | 3 | — | 2 | 3 | — |

| reserved | | | | | | | | | | | | | | | | | | |
|---|---|---|---|---|---|---|---|---|---|---|---|---|---|---|---|---|---|---|
| TPid | 1 | 2 | 3 | 4 | 5 | 6 | 7 | 8 | 9 | 10 | 11 | 12 | 13 | 14 | 15 | 16 | 17 | 18 |
| containing TPP | 1 | 1 | 2 | 2 | 3 | 3 | 4 | 4 | 5 | 5 | 6 | 6 | 7 | 7 | 8 | 8 | 9 | 9 |
| connecting Link | – | – | 1 | 2 | 4 | 3 | 2 | 1 | 5 | 6 | – | – | 3 | 4 | 5 | 6 | – | – |
| connecting Trail | 1 2 | – | – | – | – | 2 | – | – | – | 3 | – | – | 3 | – | – | 4 | 1 4 | – | linkPool

| reserved | | | |
|---|---|---|---|
| linkPoolid | 1 | 2 | 3 |
| connecting Domain | 1 | 1 | 1 |
| contained Links | 1 2 | 3 4 | 5 6 |
| source TPP | 2 | 3 | 5 |
| dest TPP | 4 | 7 | 8 | link

| reserved | | | | | | |
|---|---|---|---|---|---|---|
| linkid | 1 | 2 | 3 | 4 | 5 | 6 |
| containing Link Pool | 1 | 1 | 2 | 2 | 3 | 3 |
| supported Complex Trail | – | – | 1 | – | – | 1 |
| source TP | 3 | 4 | 6 | 5 | 9 | 10 |
| destination TP | 8 | 7 | 13 | 14 | 15 | 16 |
| total Band width | | | | | | |
| available Band width | | | | | | |

Trail

| reserved | | | |
|---|---|---|---|
| trailid | 2 | 3 | 4 |
| containing Fabric | 2 | 3 | 4 |
| supported Complex Trail | 1 | 1 | 1 |
| source TP | 1 | 13 | 16 |
| destination TP | 6 | 10 | 17 |
| QoSSpec | | | |
| prefs | | | |
| directionality | | | | complex Trail (inherits from trail)

| reserved | |
|---|---|
| trailid | 1 |
| containing Fabric | 1 |
| supported Complex Trail | – |
| source TP | 1 |
| destination TP | 17 |
| QoSSpec | |
| prefs | |
| directionality | |
| supporting Trails | 2 3 4 |
| supporting Links | 3 6 |

COMMUNICATIONS NETWORK MANAGEMENT SYSTEM

BACKGROUND OF THE INVENTION

Field of the Invention

The invention relates to a management system for a communication network.

Heretofore, there have been two primary approaches to control of distributed communication resources. The first approach is generally referred to as centralised management in which a centralised controller receives all network status data to a single logical entry point, processes this data, and then presents it to the network operator or controlling software, and finally issues commands in response to the status data. This creates a serial processing bottleneck which establishes a trade-off between the number of devices which can be controlled and the precision with which they can be controlled. While it has these disadvantages, centralised management does have a number of desirable qualities including the ability to allow a global state of the network to be presented, and it is relatively easy to integrate devices such as client software.

The other primary approach has been distributed control in which relatively fast control is provided locally at the devices so that any problems which arise are handled locally. The global behaviour of such a system is difficult to understand, validate, and extend or modify.

The problems of both of these approaches have been recognised and it has been proposed, for example, in the paper "Decentralising Control and Intelligence in Network Management" by K. Meyer, N. Erlinger, J. Betser, and C. Sunshine (Proceedings on the Fourth Symposium on Integrated Network Management, 1995) to provide a "hybrid" structure, although little specific information is given. PCT Patent Specification No. WO 95/15635 (British Telecom) describes a communications network distributed control system which is single-layered and comprises intelligent software agents, each linked with a communications network node. The agents can enter a negotiation process with customer agents in the provision of new services so as to meet the constraints of both customer requirements and the interest of the relevant service provider. While this system undoubtedly provides good improvements over many other systems for control of complex communications networks, there is still some room for improvement in providing for control of complex communication networks in a simple manner.

SUMMARY OF THE INVENTION

In particular, the invention is directed towards providing a management system which allows control of complex communication networks in a relatively simple manner in which upgrades are easily performed and conflicting requirements simply dealt with.

Another objective is to allow faster management response generally.

According to the invention, there is provided a communications network management system comprising interconnected management authorities controlling network resources, wherein:

the authorities are interconnected in a hierarchial structure;

each authority comprises a plurality of agents having means for intra-authority and inter-authority agent-to-agent asynchronous communication in a uniform protocol, at least one of the agents in each authority being an intelligent agent; and authorities above a hierarchial base level comprise means for transmission of control signals to authorities at a lower hierarchial level, said control signals including goal and constraint commands to allow operation according to global management system objectives.

In this specification, the term "intelligent agent" means a software agent which is both reactive and proactive, and so can actively select actions to exhibit goal-directed behaviour. In addition, it must be "social" whereby it must be capable of not only communicating with other agents but also maintaining a meaningful dialogue with them. This definition is based on that established in "Agents, Theories, Architectures and Languages: A Survey", Jennings N. R. & Woodridge M. J., in Proc. Intelligent Agents, Lecture Notes in Computer Science Series, Jennings and Woodridge (eds.), Springer-Verlag 1995, pp3–18.

By providing the hierarchial structure, the uniform communication, and goal and constraint commands as described, the invention in a simple manner achieves the benefits of centralised control with a degree of autonomous behaviour.

In one embodiment, each authority comprises:

a platform comprising means for performing communications routing, name resolution, directory services, and fault tolerance operations; and an upper layer using the operations of the platform and comprising agents for performing communications network management functions.

Preferably, the agents of the upper layer comprise means for performing fault, configuration, accounting, performance, services trading, resource representation and security management functions. Preferably, there is at any one time a dedicated agent for performing each of the telecommunications management functions.

In one embodiment, each authority comprises means for allowing agent-to-agent intra-authority communication without restriction, and for allowing agent-to-agent inter-authority communication only between agents performing like functions.

In another embodiment, the asynchronous communication is carried out according to a protocol allowing transmission of messages including goal commands preceded by control signals indicating message language and ontology. Preferably, the protocol is according to the Knowledge Query Manipulation Language standard. Ideally, the standard is implemented in an infrastructure in which agent and authority object servers are defined, each object server presenting a public interface and a management interface.

In one embodiment, each agent comprises a shell and a portable knowledge structure. Preferably, the shell comprises a communication module, a task stack, and an agenda module.

In another embodiment, the knowledge structure comprises a skill knowledge base defining the agent function, and a stored set of facts and beliefs related to the authority of the agent. Preferably, the skill knowledge base includes scripts, each comprising a sequence of actions associated with a triggering event. Preferably, the skill knowledge base comprises a negotiation script.

In one embodiment, each authority comprises means for assigning a resident or a reference status to each resource with which it is associated, whereby a resource having resident status may be directly controlled by the authority in an autonomous manner and a resource having reference status may be directly controlled in an autonomous manner within the constraints or indirectly after reference to the authority for which the resource has resident status if outside of the constraints.

Preferably, a plurality of authorities assign reference status to a resource and a spanning authority at a higher hierarchial level assigns resident status to that resource. Ideally, the spanning authority comprises means for performing conflict resolution operations upon requests from the lower-level authorities.

In one embodiment, each authority comprises a configuration agent comprising means for exchanging goal and constraint information with other authorities with which it is in conflict. In the later embodiment, the configuration agent preferably comprises means for exchanging goal information in the form of a hierarchial tree having resource links.

In one embodiment, each authority comprises means for recognising as a resource both physical devices and communication routes established between devices at any one time.

Preferably, a route resource is resident to an authority which spans all authorities assigning resident status to devices of the route.

In one embodiment, each authority comprises a resource agent in an upper layer for resource representation.

Preferably, the resource agent stores a resource hierarchial information model comprising resource fabric, termination point, and trial entities in which a fabric is an entity which provides a switching capability and supports the creation of trails which connect traffic between pairs of termination points.

In another embodiment, the model further comprises domain, link and complex trail entities, in which a domain is a sub-class of fabric and may contain other fabrics, a link is a permanent connection, and a complex trail has a sequence of links between fabrics and trials.

In a further embodiment, authorities comprise means for service negotiation interactively with user interfaces or other authorities for resources allocation in real-time.

Preferably, the service negotiation means comprise means for performing a five-stage negotiation process to determine a Service Level Agreement.

In one embodiment, an intelligent service agent in each authority comprises means for performing service negotiation.

In another embodiment, each service agent maintains a list of performance indices including both service and management performance indices for reference during service negotiation.

Preferably, service agents in authorities above the base level comprise means for transmitting a modified version of the Service Level Agreement to like agents in sub-authorities after service negotiation.

In a further embodiment, a configuration agent in each authority comprises means for performing local reconfiguration upon receipt of the modified Service Level Agreement.

BRIEF DESCRIPTION OF THE DRAWINGS

The invention will be more clearly understood from the following description of some embodiments thereof, given by way of example only, with reference to the accompanying drawings in which:

FIGS. 8, 9 and 10 illustrate an example of an instance of a model of FIG. 7.

DESCRIPTION OF THE INVENTION

Figure 1:
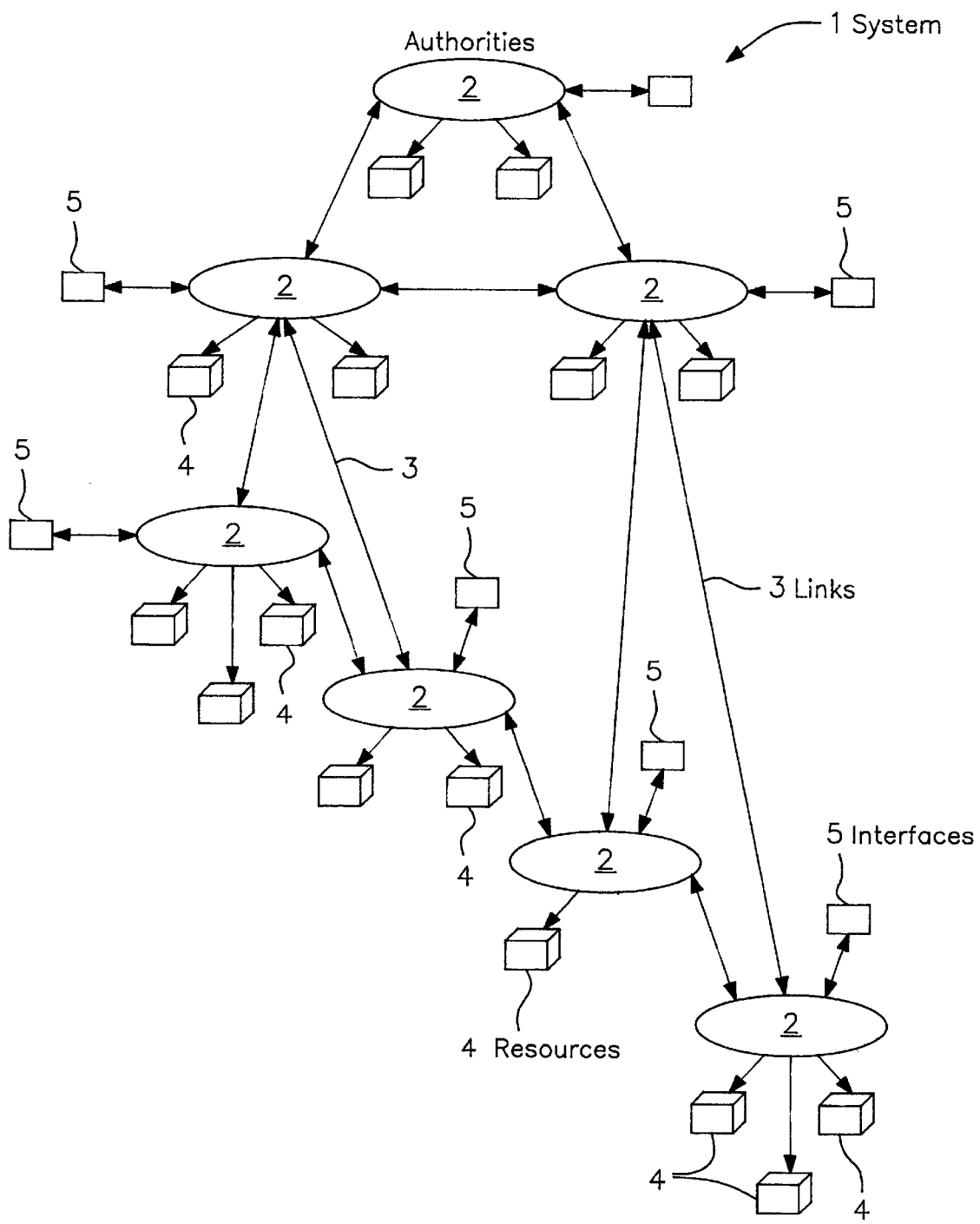
FIG. 1 is a schematic representation of a management system of the invention showing the overall structure.

Referring to FIG. 1, a management system 1 of the invention is illustrated. The system 1 comprises a hierarchical structure of authorities 2 interconnected by links 3. The authorities 2 control resources 4 of a communications network. The system 1 also comprises user interfaces 5 connected to the authorities 2. There may be any desired number of control levels in the hierarchical structure, the number being set according to the nature of the communications network being managed. In this embodiment, there are three levels, namely domain, regional and local levels in descending order through the system 1. Authorities are linked to their peers at a given level in the hierarchy.

Figure 2:
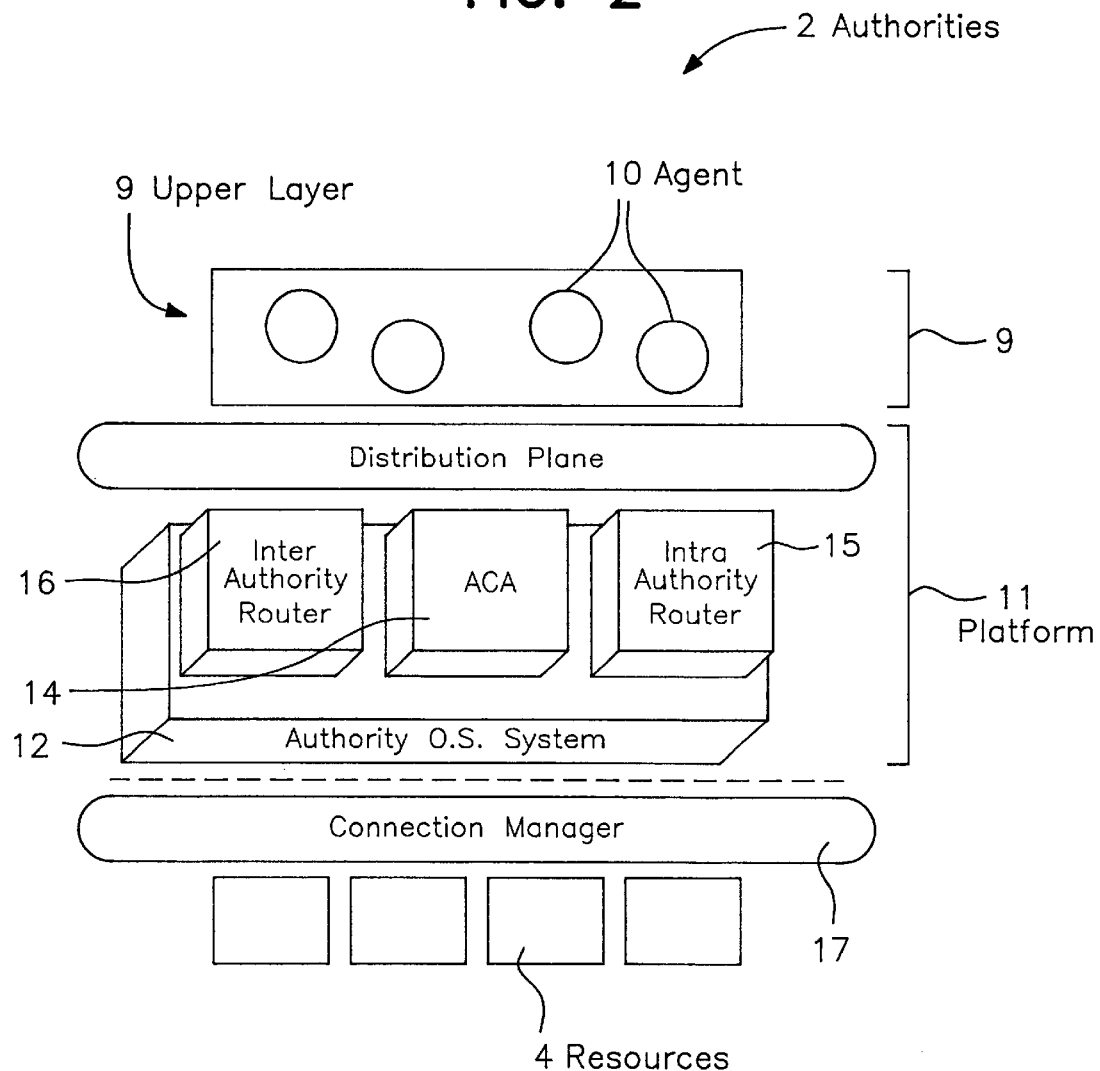
FIG. 2 is a diagram illustrating the structure of an authority of the management system.

Referring now to FIG. 2, the structure of a particular authority 2 is illustrated. The authority 2 has an upper layer 9 of agents 10. The agents 10 are described in more detail below.

The authority 2 also comprises a platform 11 having an operating system 12 and which has the following functions:

Fault tolerance—in this case implemented by ORBIX™+ ISIS™ manufactured by ISIS Distributed Systems Inc.

A distribution plane for communication with the upper layer 10.

An interface for an external connection manager operating to the TINA (Telecommunications Information Networking Architecture) principles.

Resource representation. This is a uniform representation of resources at network level and at service level. Network-level views allow full access to resources, whereas service-level views are abstractions of resources represented by a subset of available resources—the minimum set of which consists of just the link endpoints which exist at the borders of an authority's physical control domain.

The platform 11 also comprises dedicated communication/routing agents, namely an inter-authority router 15, an intra-authority router 16, and communications protocol code to allow communication. The platform 1 also comprises a connection manager 17, and an authority controlling agent (ACA) 14 which performs the following functions:

Initiating communication with the user interfaces 5.

Creating the agent 16 and more generally creating instances of agent 10 and ensuring that the router agent 16 maintains correct agent 10 references.

Acting as an interface between the upper layer agents 10 and the inter-authority router agent 15.

In the upper layer 9, the primary functions of the agents 10 are those known as the FCAPS functions, namely fault, configuration, accounting, performance and security management functions. Many of the agents 10 are capable of communicating, both to other agents within its authority (intra-authority communication) and to agents in other authorities (inter-authority communication). Communication signals are routed through the platform 11.

The intra-authority router agent 16 maintains a table linking functions with agents 10 to allow role or function addressed messaging within the authority 2.

Further, an agent 10, namely a resource agent stores in tables indicators which link resources 4 to the authority 2. To do this, it assigns a resident or a reference status for all of the resources 4 which are associated with that authority. The resource agent 10 works in conjunction with the resource representation functions of the platform 11. This is described in more detail below.

The platform 11 allows intra-authority agent-to-agent communication in an essentially unlimited manner. However, it restricts inter-authority agent-to-agent communication to agents performing similar functions. This is necessary to achieve a global level of system control without excessive inter-authority communication. The communication protocol is of the KQML (Knowledge Query Manipulation Language) type for both intra-authority and inter-authority communication. This provides a uniform protocol for agent-to-agent communication. Important aspects include:

It allows transmission of goal commands and information queries preceded by control signals indicating message language and ontology. For example, the ontology may be the TINA NRIM (network resource information model) associated with the message. In the example the language indicated may be KIF (Knowledge Interchange Format) or CLIPS (C Language integrated production system).

The links have a non-zero method transport delay associated with them.

An agent "knows" on which link a message arrived.

An agent may specify an outgoing link for a message.

Messages to a single destination arrive in the order they were sent.

Message delivery is reliable.

The KQML standard defines general message format and protocol. It does not however specify an implementation. KQML message transfer is part of a larger computational infrastructure in which agents reside/are situated. This infrastructure is implemented using the CORBA distributed object standard and the Orbix product from Iona Technologies in particular.

The KQML message is implemented as an Interface Definition Language structure.

A message comprises an ASCII string in a particular syntax. A message comprises a frame consisting of a number of ASCII parameters of variable lengths. In the KQML CORBA implementation adopted, each attribute is implemented as a slot in an IDL structure which is passed between distributed agents.

Figure 3:
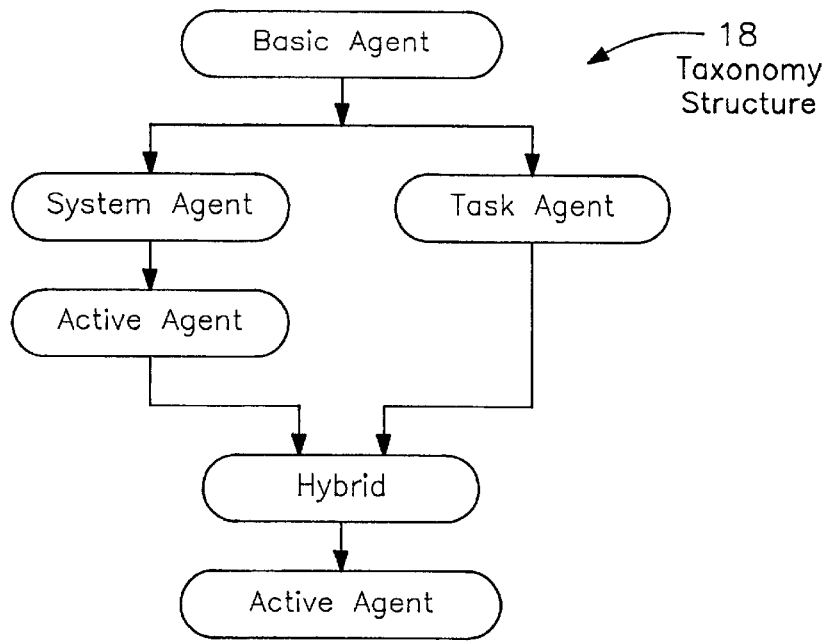
FIG. 3 is a diagram illustrating the agent types within authorities.
Figure 4:
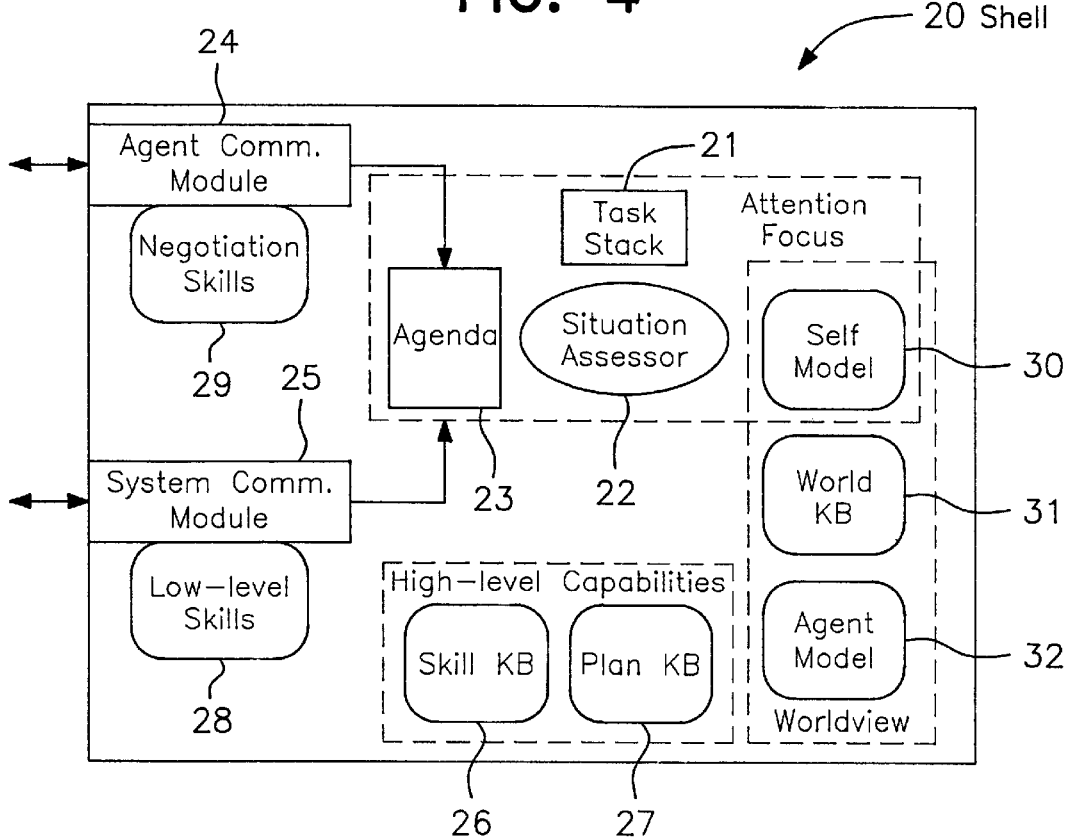
FIG. 4 is a diagram illustrating structure of an intelligent agent.

Referring now to FIGS. 3 and 4, the agents which make up the authorities 2 are now described in more detail. An agent is a proactive computational object and accordingly, unlike the object-oriented paradigm, they are not merely responsive to requests but can initiate their own actions. Agent behaviour is a function of three aspects:

incoming requests from external agents, users, and systems;

incoming system events which must be responded to; and installed goals which the agents strive to achieve and installed constraints which limit the range of possible action the agent can take.

An important aspect of agent operation is that it is according to goal and constraint information received from other authorities within the system, usually supra-authorities. This allows a behavioural rather than a functional mode of operation. This provides two distinct benefits:

It provides the necessary freedom to promote local decision making by specifying objects or goals to be achieved by the authority, rather than functions to be called. An authority which receives a goal request can take any sequence of actions which fulfils this goal, using any suitable set of agents 10.

It allows a form of behavioural abstraction rather than functional abstraction. In other words, it allows the authority to ascribe attitudes to entities. For example, if the system has a goal of maintaining optimality, then actions of the authority can be interpreted as attempting to fulfil or maintain this goal. This is a useful abstraction tool for understanding large and complex communication networks.

Referring to FIG. 3, a taxonomy structure 18 of agent types within the management system 1 is illustrated. This structure encompasses agents 10 both within the upper layer 9 and within the platform 11 of an authority. The "basic" agent type is completely passive and supports a KQML interface. Specific control rules can be uploaded to or downloaded from the agent. The basic agent has declarative scripts to handle incoming messages (termed skills). It is passive in the sense that it becomes active only when messages arrive.

The "system" type of agent extends functionality from the basic type and is also passive. Its main function is to interface with a device. It has a set of scripts which are called in response to incoming system events. An example is the resource agent.

An agent of the "active" type extends functionality from agents of the system type, but are somewhat proactive in that they execute nominated scripts each time through their event loops.

An agent of the "task" type extends functionality from an agent of the basic type and includes the ability to manage a set of concurrent task contexts. This type of agent is also passive.

An agent of the "hybrid" type extends functionality from both the active and task agent types and introduces a situation assessor to determine focus. The function of the situation assessor allows an agent to determine whether a particular task should be continued or a goal pursued given the current environment. The hybrid agent therefore allows a mix of reactive and deliberate reasoning. To support this, the agent's skill and execution should be interruptible and limits on the depth of any reasoning performance are set. These limits can be variable so that the agent can become either more reactive or more introspective, depending on the environment.

An agent of the "intelligent" type extends the hybrid agent type to include negotiation skills. Negotiation skills extend an agent's ability from being able to handle incoming KQML messages to being able to handle a dialogue so that it is "social".

That part of an agent which is common to all agents is referred to as the shell 20. Referring to FIG. 4, the shell 20 comprises a task stack 21, the situation assessor 22, an agenda 23, an agent communication module 24, and a system communication module 25. The remainder is referred to as the "knowledge structure" and has two parts, namely:

Skills including a skill knowledge base (KB) 26, a plan KB 27, a low-level skills module 28, and a negotiation skills module 29. Skills are related to agent function.

Facts and beliefs related to the authority, including a self model 30, a world KB 31 and an agent 32.

Two configuration agents 10 in different authorities 2 will have the same skills because they perform the same functions, but not the same facts and beliefs because these are associated with the particular authority and more particularly its resources.

Fact and belief knowledge is entered into one of the worldview knowledge-base, whereas procedure knowledge is entered into one of the three skill bases (low-level, negotiation and the main-dependent skills). When system events arise, they are quickly matched against the low-level skills, Similarly, agent service requests are matched against negotiation skills. Skills are implemented as partial plan scripts, allowing goals to be created where necessary. This allows agents to support different programming styles from simple event programming to adaptive reasoning.

Skill scripts are pre-defined sequences of actions which are associated with some triggering event. Triggering events can be a newly learned fact, a system event, receipt of an external request or a goal which is active.

Agents are software objects that conform to a strictly defined architecture. Agents differ in terms of the knowledge they hold. This allows for storage and retrieval of agents, by storing their knowledge structures in files or suitable storage devices. Another important feature of agents is their ability to migrate between authority platforms. In implementation terms, this involves stopping the execution of an agent, storing an agent's knowledge structures to file, transmitting this file to a remote authority, this authority activating a new empty agent shell and installing the knowledge structures from the file in the agents knowledge base. Such migration allows for straightforward dispatch of agents between authorities.

As illustrated in FIG. 4, an important feature of the agents is that they are associated with skills, in this case defined by scripts with triggers. Further, each intelligent agent has a reflective, reactive architecture in which there are two subsystems—one for high-level planning, and another for low-level system tasks. In more detail, a mix between reactive and reflective (deliberative planning) is desirable for the agent specification. Such a specification implies a head-body dichotomy. The reactive body functions with only limited knowledge, but it is effective under normal conditions (precise and fast). The head models the reflective system, producing plans to achieve high-level goals. It utilises much broader knowledge, considering more contextual information, but at a slower time-granularity and less precisely. In addition, the head is responsible for the continued performance of the lower-level (body) sub-system and it must evaluate and modify the control parameters of the body sub-system to take into account changing environmental conditions.

In more detail, the agent of FIG. 4 comprises:

World Knowledge base 31—the set of facts/beliefs held by the agent. These typically constitute knowledge of the existence of objects and their associated states in the world. World knowledge is acquired either through the handling of system events (for example, resource notifications), as the result of deduction or executing a skill, or as a result of other agents informing the agent of a particular fact.

Self-Model 30—the set of goals/constraints under which the agent is operating (mental state). Self-knowledge is acquired by accepting requests (which establish goals to be obtained sometime in the future, or constraints to limit behaviour). Thus goals are used by the situation assessor and if they receive the agents attention will typically result in the invocation of either the skillbase or the deductive powers of the planbase. Constraints on the other had form both an evaluation context in which to choose between competing skills/deductive operators, and part of the information to be exchanged during negotiation. The particular world model that an agent supports is indicated by an ontology name. This is supported by the ontology attribute of KQML messages. When a message arrives, for example a TELL performative, the agent checks to see if its world model is the same as the ontology named in the message, if so then it should be able to understand the contents of the message. In addition to an object model to characterise the items an agent knows about, the world model also contains specific rules about the relationships between objects in the world. When changes to the world model are made, by system events or agent messages, world-model rules are matched and fired in order to ensure that the consistency of the world-model is maintained.

Goals are identified by a goal name and a predicate sentence which can be matched against the world-model to test to see if the goal has been achieved. The goal structure also indexes those skills which are preferential in achieving the goal. The goal structure also contains a qualitative measure of how important the goal is in a default setting, together with a quantitative value for how confident the agent-designer was with the choice for the qualitative importance measure. Finally, the goal structure indexes those goals which are likely to be inhibited or facilitated by the fulfilment of the goal itself. The situation assessor estimates the importance of all goals using their qualitative and quantitative measures. In addition to containing information about it's own importance, a goal structure also contains qualitative and quantitative ratings for other goals which can possibly exist in the system. This helps to model how goals interact with each other. The default importance rating for a goal is modified by virtue of any such inhibition or facilitation relationships which exist between goals.

The situation assessor uses this relative measure to select which goals to focus on.

Agent-Model 32—the set of beliefs about other agents (acquaintance model). This characterises known (or deduced) intentions about other agents—primarily the services they can provide and what they are interested in. Agent knowledge is acquired through communication with other agents. The agent model consists of a list of acquaintance structures containing agent names and the predicate sentences relating to which services they offer to the community of agents. These structures can be augmented with predicate sentences estimating the performance of these agents in fulfilling services.

Together the three components described above contain the transient knowledge of the agent which is associated with the particular authority in which it is located.

Skillbase 26—set of pre-compiled plans. Skills can either react to external or internal events. In order to speed up the operation of these, they are indexed by arranging their pre-conditions into a partially-ordered set. In detail, a skill consists of a number of attributes; (a) A set of pre-conditions which determine when the skill can be used. These are matched against the world-model. Each pre-condition can be a method associated with it which can be used as a quick method for achieving the pre-condition. (b) An index of which goals the skill can be used to fix. (c) A sequence of transactions.

A transaction is non-interruptible sequence of steps. A step can either be an action to be performed directly by the agent, a wait condition, or a sub-goal to be achieved. In this way skills can be used to implement hierarchical planning. (d) A set of changes which are to be made to the world-model on successful completion of the skill.

Planning base 27—this contains a set of general rules and operators which govern the behaviour of the goal and skill-matching in the agent shell. Knowledge in this module is organised into structures called contexts. An agent operates according to a context. This context modifies goal importance and skill selection. The operation of contexts is according to the case-based reasoning model. In particular, a context structure contains: (a) A set of features which can be used to match against the world model to retrieve the appropriate context structure from a set of candidate context. (b) A set of actions to be taken immediately on recognition of the context. (c) Modifiers to default goal importance values—this allows some goals to become more important in some scenarios. (d) A list of expected events for the current context. (e) A list of preferred goal-skill pairs.

Negotiation-models 24—the set of negotiation protocols supported by the agent, primarily to perform service-level negotiation. The negotiation models consist of rules to decode and handle the different incoming KQML message types together with rules and dialogue structures to handle negotiation.

Low-level Skillbase 28—system-level skills which are invoked in response to system-level events. Low-level level skills contain rules for extracting the information from incoming system events and handling this information. It should be noted that the matching between low-level skills and incoming events does not involve goal handling. Low-level skills are matched directly in response to system events—i.e. there is no interpretive goal step. This allows fast reactive behaviour.

Together these four components contain the agent's "intelligence" or logic. It should be noted that each module has its own knowledge structures. One primary feature of these knowledge structures is to store (or "chunk") procedural information about other knowledge structures so that lengthy reasoning can be avoided. For example, the goal structure contains knowledge about which skills can be used to achieve this. The collation of such knowledge could be automated by creating learning algorithms that modify the contents of "chunked" knowledge based on experience.

Agent-Communication module 24—functions for interfacing with other agents using high-level KQML performatives.

System-communication model 25—function for interfacing with artifacts and authority platform functions.

Task-stack 21—the agent is a multi-tasking entity and thus requires the ability to store state information for current tasks.

An Agenda 23—to store incoming external events (other agents and system-level). The Agenda automatically organises these into a priority system (the same used by the situation assessor) in order to minimise the need for burden or context switching. The negotiation KB and the low-level skillbase act to filter out non-important messages.

Situation Assessor 22—control logic which governs the switching between external (agenda), internal (agent-model and planning base) and committed (task-list) responsibilities. This is, if you like, the "brain" of the agent. It governs what will be the focus of the agent's attention. This is defined as a function which interfaces with the agenda, the task-stack and the goal-stack in the agent-model. There is no set definition for this component. It could be defined simply as a priority system, with levels assigned to tasks, agenda-messages and goals respectively. Alternatively, it could be modelled as a finite-state system where what gets processed first depends on context.

These form the agent shell.

Figure 5:
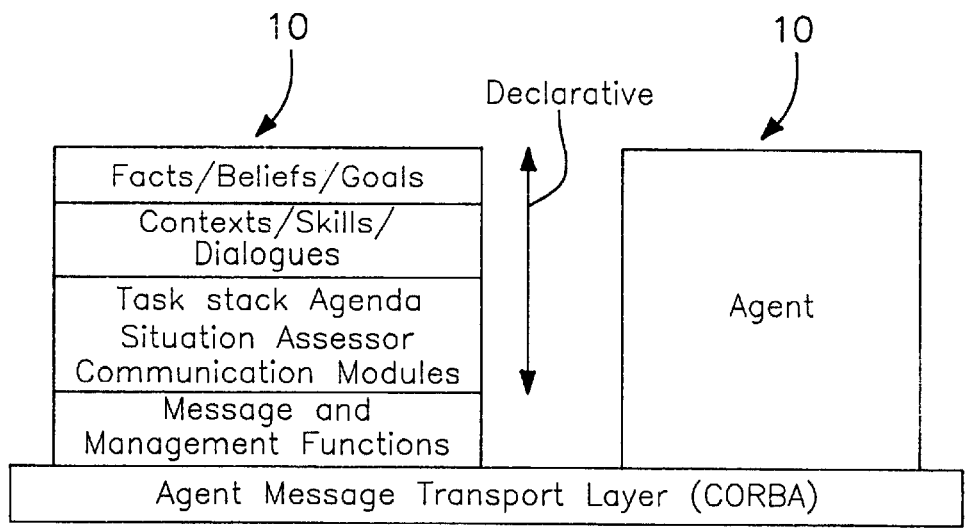
FIG. 5 is a diagram which summarises declarative structures within an agent.

The declarative structures used in an agent are summarised in FIG. 5. The agent shell provides the core functionality. The agent logic provides the capabilities. For example, a configuration agent and a performance agent would have different capabilities and thus different skills. The facts, beliefs and beliefs relate to the agent's authority. For example, two configuration agents in different authorities have the same capabilities (i.e. the same set of skills), but would have different facts, beliefs and goals as they exist in different authorities.

Figure 6:
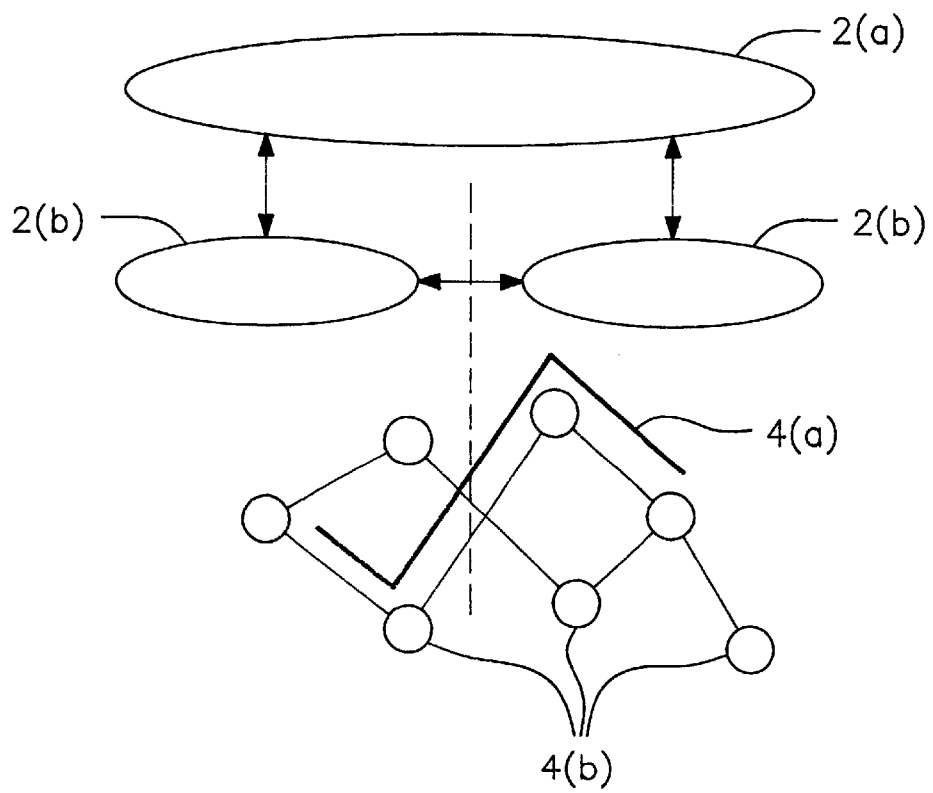
FIG. 6 is a diagram illustrating an aspect of the manner in which resources are controlled by authorities.

Referring to FIG. 6, the manner in which authorities control resources 5 is illustrated. In this diagram, there is illustrated a spanning authority 2(*a*) at a higher hierarchial level than two authorities 2(*b*). A resource may be a route which is for the time being established between communication devices 4(*b*). Resources are resident in only one authority and are referred by other authorities. The authorities 2(*b*) shown in FIG. 5 direct control of devices 4(*b*), however, their borders share the common route resource 4(*a*). The resource 4(*a*) is resident to the spanning authority 2(*a*) as it spans all of the authorities 2(*b*) which assign resident status to the devices 4(*b*) of the route.

Returning again to the agents 10 of the authorities 2, each authority 2 has fault, configuration, accounting, performance, and security agents 10. These agents collectively manage the resources and functions using the services of the authority platform as directed by higher-level authorities or user interfaces. They communicate with like agents located in other authorities formulating actions to fulfil their local goals and network goals (as represented by the collective goals of all authorities). As stated above, the inter-authority communication uses the KQML semantics for compatibility with internal, intra-authority communication. The three most common types of inter-authority signal as follows:

Tell—telling an authority some "facts";

Ask—asking an authority a query;

Achieve—installation of a goal into an authority.

A service agent 10 within each authority 2 facilitates a tendering and bidding process between the associated authority 2, user interfaces 5 and other authorities 2. There is a five stage process for service negotiation and management, as follows:

Request, Clarity, Monitor, Re-negotiate, and Terminate.

Service negotiation is initiated on receipt of a service description request. Then a cycle of clarification-explain is entered into where the service offering is developed and performance goals and constraints are established. The client then either commits to the service or abandons negotiation. Both parties now enter a monitoring stage where the services may be re-negotiated according to constraints established during the clarify stage. The final stage ensures that service is properly terminated.

The five-stage negotiation model covers the interface between the customers and the authorities. The customer initiates the negotiation by sending a propose KQML message to the service agent in authority in the hierarchy. The propose message contains a set of termination points for the required resource trail, together with traffic descriptions and desired Quality of Service (QoS) characteristics. The service agent contacts the local configuration agent (using ask performative) to determine whether it is the spanning authority. If not, it forwards the propose message to the service agent in a higher authority and the process continues. If the service agent belongs to the spanning authority, then it creates a Service Level Agreement (SLA) which contains information about the contract between the authority and the customer. This structure contains information about (a) the QoS constraints; (b) traffic descriptors/traffic demand schedule; (c) obligations on behalf of both parties; (d) permissions on behalf of the authority to modify the service; (e) penalty clauses for termination; (f) the negotiated cost. The service agent must respond to the customer with an offer described by the SLA, primarily by cost and the QoS the authority can provide. To do this it contacts the configuration agent (again using ask) to determine a set of possible routes (possibly involving routing via sub-authorities). In a perfect world, where messaging involves zero delay and computation time, the service agent would then contact the service agent in each sub-authority to determine whether it could provide the required service and at what cost. However, in order to limit interactions between distributed agents and therefore increase the performance of the system, each service agent maintains a list of performance indices which describe the performance of the sub-authorities together with an estimate of how congested the termination points at the borders of the sub-authorities region are. The performance indices are divided into two types; (a) Service performance—this captures how well a particular sub-authority can provide a service. Example indices are mean-time between failures and bit-error rates. (b) Management performance—this captures how the whole region of the authority will benefit by routing a request through a specific authority. Management performance indices fall into two categories: (i) group indices, for example balanced utilisation, and (ii) member indices which determine minimum levels of performance from regions. Together the service and performance indices together with the termination point estimates allow the service agent to decide which of the candidate routes returned by the configuration agent to prefer without contacting the sub-authorities themselves. The performance agent is responsible for sending staggered performance indices reports about sub-authorities to the service agent.

Once the service agent has a preferred route, it can make an offer to the customer. The customer may accept, reject or counter-propose (add additional constraints to the SLA). If the customer accepts, then the service agent advances the state of the dialogue to monitor and commits the service. To accomplish this, it sends an achieve KQML message to sub-authorities to create the service. The achieve message contains a modified version of the SLA, for example if the customer wished a maximum transfer delay of 60 ms end-to-end, then the authority could specify a maximum transfer delay for the sub-authority of 30 ms. This process is recursive. Once the service has been committed, the configuration agent in the authority and all referenced sub-authorities that the resource traverses are committed.

The authorities co-ordinate their efforts in order to maintain system-wide objectives. Referring again to FIG. 1, the domain and regional authorities can impose configuration requests and constraints on their respective sub-authorities, however, each authority has default control over its own resources without the need for central intervention. The root of the hierarchy (the domain level) has the most global knowledge, and least detailed knowledge, while the leaves of the hierarchy have only local knowledge, but the most detailed knowledge.

Clearly, with autonomous operation of authorities, conflict can arise. The conflicts are handled by way of the goal and constraint signals which are received by the authorities. These act to direct solution of the conflicts by communication to ensure network-wide objectives are met. If two peer authorities cannot reach consensus, then the problem is referred to a higher level authority which arbitrates with the benefit of its more global knowledge.

When re-configuration of resources becomes necessary (either due to a new incoming request for service or an environmental event such as link failure, congestion or increased error-rate) then the local authority (i.e. the authority whose control region includes the problem resource and has resident status) attempts to achieve a local solution. The authority initiates re-configuration in response to violated goals in its self-model. A local solution in this context means that the resource is re-routed so that its termination points are maintained and the constraints specified by its modified SLA are maintained. After a pre-defined timeout period the authority must either signal failure or have produced a solution. If no solution is possible, then the spanning authority for the resource arbitrates a decision for the problem, based on its more global knowledge.

In particular, the configuration agent provides a potential solution to each of the customer agents which are affected. These customer agents can either accept it, reject it, or propose a counter-solution. This process is governed by the negotiation state of the conversation. Agents exchange state and goal information to support this activity using KQML primitives and in the context of the established SLA. In order to resolve conflicts the agents can relax goals and constraints under which they operate to allow for alternative but satisfying goals to be used.

In this embodiment, re-negotiation information is exchanged and it includes both goal and state information. The goal information may be received by an authority in the form of an hierarchial tree, as this provides an extensive amount of planning information and allows consensus to be reached by goal relaxation. When a conflict arises, the goal trees of conflicting authorities may be exchanged, and alternative links provided by these trees explored. If necessary, constraints may then be modified to allow consensus. This allows for both local and non-local re-configuration, ensuring that the task is handled at the appropriate level(s) in the authority hierarchy.

As an example, as resources have resident and/or reference links with authorities, priority schemes with respect to resource allocation problems may be established. An authority will have a number of resident resources in its control and also a number of references to resources. Thus, an authority is free to re-configure resources under its control, but if it requires re-configuration of a referenced resource, this request must be sent to the spanning authority if the SLA is to be violated. In general, each authority manipulates only resident resources first in resource allocation problems and this reduces the computational complexity.

In the management network of the invention, the result of an operation is summarised to the highest authority which spans the involved local authorities. It is the responsibility of the performance agent in an authority to provide performance summaries to the collection of agents as required. Individual agents can subscribe to a particular performance summary. These can be threshold or percentage-change based. Typically, the performance agent in a higher authority and the service agent in the same authority will subscribe to performance summaries. This staggered manner of performance updates helps to keep higher-level authorities informed while reducing message traffic. An additional service provided by the performance agent is to provide performance predictions in a similar manner. The performance agent informs the service agent when the traffic demand schedule associated with a customer's resource is about to change. This allows preventative negotiation to occur. In this way, the correct information is present at the correct level in the hierarchy. In addition, management operations can originate from any portion of the hierarchy. The nature of the operation will determine how "high" or how "low" the communication will progress.

As stated above, communication can only take place between like agents across authorities, the routing being from the agents through the routers 15 and 16. For example, a performance agent in one authority can only communicate with a performance agent in another authority.

An agent response is a function of:

its general planning ability, as it attempts to satisfy requests and goals, specific installed skill scripts, installed facts and beliefs.

Figure 7:
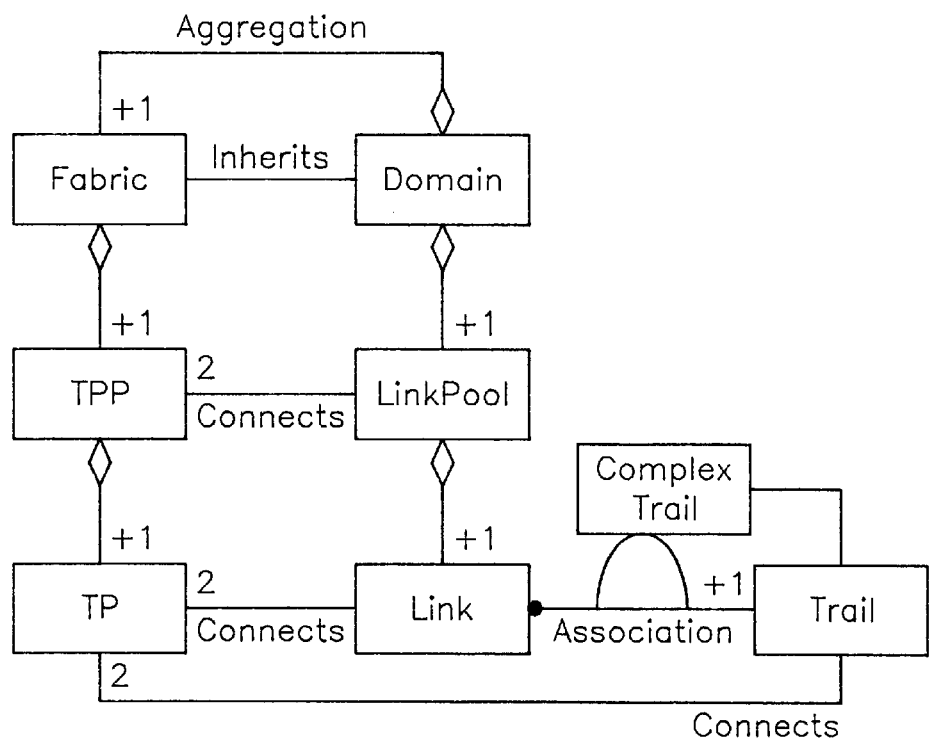
FIG. 7 is a diagram illustrating an information model for resource representation.

A resource agent 10 communicates through the platform 11 with the connection manager 17 using a hierarchial information model. The structure of this model is given in FIG. 7 and an example of a model instance is illustrated in FIGS. 8, 9 and 10.

Figure 8:
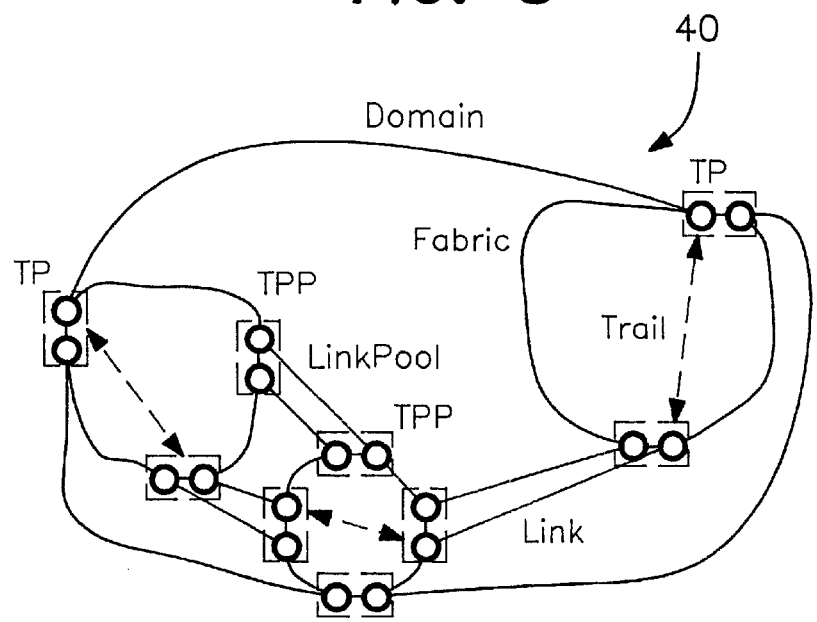

Referring to FIG. 8, a sample communications network configuration 40 is shown. Basic connectivity is modelled with reference to the entities Fabric, Termination Point (TP), and Trail, the entity relationship diagram for which is given in FIG. 7. OMT (Object Modelling Technique) labelling is used. A fabric is an entity which provides a switching capability and supports the creation of trails that connect traffic between pairs of termination points.

A hierarchical geographical structure is modelled by the inclusion of the additional entities, Domain, Link and Complex Trail. A Domain is a sub-class of Fabric that can contain other Fabrics. These Fabrics may in turn be Domains which contain more Fabrics. This allows a hierarchy of arbitrary complexity to be modelled. The Fabrics within a Domain are interconnnected by Link entities. A Link differs from a Trail in that the connection is permanent whereas Trails can be created dynamically. A Complex Trail can be set-up across a Domain by means of a recursive algorithm with each Domain partitioning the routing task into subtasks which are then allocated to contained Fabrics.

Such Complex Trails are supported by a sequence of links between Fabrics and Trails within contained Fabrics. The structure of a Complex Trail can thus be arbitrarily complex. The hierarchy is organised on the basis that the internal structure of a Fabric is hidden from its containing Domain. Each Domain is capable of seeing only an external view of all contained Fabrics i.e. its TPs and Trails. Each Domain can thus see no further than one level down the Domain hierarchy even though the hierarchy can be arbitrarily deep.

In networks with multiplexing, a number of separate channels are transported together over a single physical medium. In order to model this in the current model, Links and Termination Points must be logically grouped. This facility is supported by the entities Link Pool and Termination Point Pool (TPP).

The information model is illustrated by means of an example modelled network showing the various types of objects graphically in FIG. 8. In addition the model is expressed as an entity relationship diagram in FIG. 7 and a summary of definitions of each relationship are given as follows:

A Fabric contains a number of TPPs.

A Fabric supports a number of Trails.

A Domain is a sub-class of Fabric.

A Domain contains a number of TPPs. (Externally visible ones only).

A Domain can contain a number of Fabrics.

A Domain contains a number of Link Pools.

A TPP contains a number of TPs. (All TPs must have a parent TPP).

A link Pool connects a TPP with another TPP.

A Link Pool contains a number of Links. (All Links must have a parent Link Pool).

A Link connects a TP to another TP.

A Trial connects one TP to another TP.

A Complex Trail is a sub-class of Trail.

A Complex Trail is supported by a number of Trails and a number of Links.

The network shown in FIG. 8 is shown in FIG. 9 with all the resource objects numbered. A global naming/object reference scheme is used in this example. Object templates are shown in FIG. 9, each instance in the model being represented as a column in a table.

It will be appreciated that the invention provides a management system which is built from simple building blocks which may be easily interconnected. In this way, control of complex communication networks is achieved without the need for a complex management system. This is achieved because of the hierarchial interconnection of authorities, each authority having agents and some of which are intelligent. The manner in which each authority assigns a status to a resource is very important for quick and effective configuration and conflict resolution.

The fact that agents communicate with each other internally within an authority and externally between authorities in a simple and uniform manner provides for simplicity across the management system. The use of goal and constraint signals transmitted between authorities helps to ensure that global objectives are achieved, while at the same time providing for autonomous authority operation for fast and effective responses in resource control. The system is easily scaled because of this structure as agents may be easily added or deleted as required.

Further, it will be appreciated that the management system provides a large degree of flexibility. For example, agents representing customers can be created and installed in an authority. Should resource contention or congestion arise, these agents can be included in the negotiation. In one example, such an agent may be a user-defined profile or alternatively one equipped with decision-making capabilities.

The invention is not limited to the embodiments hereinbefore described, but may be varied in construction and detail.

What is claimed is:

1. A communications network management system comprising:

a plurality of interconnected management authorities controlling network resources;

means for interconnecting in a hierarchial structure;

each management authority comprises a plurality of agents, the agents having means for intra-authority and inter-authority agent-to-agent asynchronous communication in a uniform protocol and at least one of the agents in each management authority being an intelligent agent;

said management authorities above a hierarchical base level comprising means for transmission of control signals to authorities at a lower hierarchical level, said control signals including goal and constraint commands to allow operation according to global management system objectives; and each authority comprises means for assigning a resident or a reference status to each resource with which it is associated, whereby a resource having resident status may be directly controlled by the authority in an autonomous manner and a resource having reference status may be directly controlled in an autonomous manner within the constraints or indirectly after reference to the authority for which the resource has resident status if outside of the constraints.

2. The management system as claimed in claim 1, wherein each authority comprises:

a platform comprising means for performing communications routing, name resolution, directory services, and fault tolerance operations; and an upper layer using the operations of the platform and comprising agents for performing communications network management functions.

3. The management system as claimed in claim 2, wherein the agents of the upper layer comprise means for performing fault, configuration, accounting, performance, services trading, resource representation and security management functions.

4. The management system as claimed in claim 3, wherein there is at any one time a dedicated agent for performing each of the telecommunications management functions.

5. The management system as claimed in claim 4, wherein each authority comprises means for allowing agent-to-agent intra-authority communication without restriction, and for allowing agent-to-agent inter-authority communication only between agents performing like functions.

6. The management system as claimed in claim 1, wherein the asynchronous communication is carried out according to a protocol allowing transmission of messages including goal commands preceded by control signals indicating message language and ontology.

7. The management system as claimed in claim 6, wherein the protocol is according to the Knowledge Query Manipulation Language standard.

8. The management system as claimed in claim 7, wherein the standard is implemented in an infrastructure in which agent and authority object servers are defined, each object server presenting a public interface and a management interface.

9. The management system as claimed in claim 1, wherein each agent comprises a shell and a portable knowledge structure.

10. The management system as claimed in claim 9, wherein the shell comprises a communication module, a task stack, and an agenda module.

11. The management system as claimed in claim 9, wherein the knowledge structure comprises a skill knowledge base defining the agent function, and a stored set of facts and beliefs related to the authority of the agent.

12. The management system as claimed in claim 11, wherein the skill knowledge base includes scripts, each comprising a sequence of actions associated with a triggering event.

13. The management system as claimed in claim 12, wherein the skill knowledge base comprises a negotiation script.

14. The management system as claimed in claim 1, wherein a plurality of authorities assign reference status to a resource and a spanning authority at a higher hierarchial level assigns resident status to that source.

15. The management system as claimed in claim 14, wherein the spanning authority comprises means for performing conflict resolution operations upon requests from the lower-level authorities.

16. The management system as claimed in claim 15, wherein each authority comprises a configuration agent comprising means for exchanging goal and constraint information with other authorities with which it is in conflict.

17. The management system as claimed in claim 16, wherein the configuration agent comprises means for exchanging goal information in the form of a hierarchial tree having resource links.

18. The management system as claimed in claim 1, wherein each authority comprises means for recognising as a resource both physical devices and communication routes established between devices at any one time.

19. The management system as claimed in claim 18, wherein a route resource is resident to an authority which spans all authorities assigning resident status to devices of the route.

20. The management system as claimed in claim 1, wherein each authority comprises a resource agent in an upper layer for resource representation.

21. The management system as claimed in claim 20, wherein the resource agent stores a resource hierarchial information model comprising resource fabric, termination point, and trail entities in which a fabric is an entity which provides a switching capability and supports the creation of trails which connect traffic between pairs of termination points.

22. The management system as claimed in claim 21, wherein the model further comprises domain, link and complex trail entities, in which a domain is a sub-class of fabric and may contain other fabrics, a link is a permanent connection, and a complex trail has a sequence of links between fabrics and trails.

23. The management system as claimed in claim 1, wherein authorities comprise means for service negotiation interactively with user interfaces or other authorities for resources allocation in real-time.

24. The management system as claimed in claim 23, wherein the service negotiation means comprises means for performing a five-stage negotiation process to determine a Service Level Agreement.

25. The management system as claimed in claim 24, wherein an intelligent service agent in each authority comprises means for performing service negotiation.

26. The management system as claimed in claim 25, wherein each service agent maintains a list of performance indices including both service and management performance indices for reference during service negotiation.

27. The management system as claimed in claim 26, wherein service agents in authorities above the base level comprise means for transmitting a modified version of the Service Level Agreement to like agents in sub-authorities after service negotiation.

28. The management system as claimed in claim 27, wherein a configuration agent in each authority comprises means for performing local re-configuration upon receipt of the modified Service Level Agreement.

* * * * *